United States Patent [19]

Konuma et al.

[11] Patent Number: 5,301,046
[45] Date of Patent: Apr. 5, 1994

[54] ELECTRO-OPTICAL DEVICE HAVING A LAYER COMPRISING AN OBLATE LIQUID CRYSTAL DISPERSED IN A RESIN AND METHOD FOR FORMING THE SAME

[75] Inventors: Toshimitsu Konuma; Toshiji Hamatani, both of Kanagawa; Shunpei Yamazaki, Tokyo, all of Japan

[73] Assignee: Semiconductor Energy Laboratory Co., Ltd., Kanagawa, Japan

[21] Appl. No.: 947,456

[22] Filed: Sep. 21, 1992

[30] Foreign Application Priority Data

Sep. 21, 1991 [JP] Japan ................. 3-270360

[51] Int. Cl.$^5$ ........................................ G02F 1/133
[52] U.S. Cl. ................................. 359/51; 359/52
[58] Field of Search .................................. 359/51, 52

[56] References Cited

U.S. PATENT DOCUMENTS 4,688,900 8/1987 Doane et al. .................. 359/52
5,113,270 5/1992 Fergason ........................ 359/51

*Primary Examiner*—William L. Sikes
*Assistant Examiner*—Huy Mai
*Attorney, Agent, or Firm*—Sixbey, Friedman, Leedom & Ferguson

[57] ABSTRACT

A liquid crystal electro-optical device based on a dispersion-type liquid crystal, comprising a pair of substrates at least one of which is light-transmitting, having established thereon electrodes and an electro-optical modulating layer having incorporated between said pair of substrates, said electro-optical modulating layer being composed of a resin support having dispersed therein a liquid crystal material, wherein, the liquid crystal material as viewed in the cross section is dispersed in the resin support as droplets flattened along the direction parallel to the substrates. The dispersion-type liquid crystal electro-optical device according to the present invention has a high scattering efficiency and provides an excellent light-transmittance upon application of an electric field.

24 Claims, 3 Drawing Sheets

ELECTRO-OPTICAL DEVICE HAVING A LAYER COMPRISING AN OBLATE LIQUID CRYSTAL DISPERSED IN A RESIN AND METHOD FOR FORMING THE SAME

BACKGROUND OF THE INVENTION

1. Field of the Invention

The present invention relates to a dispersion-type liquid crystal electro-optical device based on a liquid crystal resin composite comprising a polymer resin having dispersed therein a liquid crystal material, and a method for forming the same. More particularly, the present invention provides a liquid crystal electro-optical device comprising substrates having set at a little spacing, yet achieving high scattering efficiency.

2. Prior Art

Many liquid crystal electro-optical devices operating on a twisted nematic (TN) or a super-twisted nematic (STN) mode using nematic liquid crystal and the like are known and put into practice. Recently, there is also known a device using ferroelectric liquid crystals. All those liquid crystal electro-optical devices basically comprise a first and a second substrate each having provided thereon an electrode and a lead, and a liquid crystal composition being incorporated between those facing two substrates. Thus, by applying an electric field between the electrodes, the state of the liquid crystal molecules having incorporated between the substrates are changed according to the anisotropy in dielectric constant. Otherwise, in the case of ferroelectric liquid crystals, the state of the liquid crystal molecules are changed according to the spontaneous polarization of the liquid crystal molecule itself. The liquid crystal devices take advantage of this electro-optical effect for displaying images.

In a liquid crystal operating in a TN or an STN mode, the liquid crystal molecules which are brought into contact with the two substrates are subjected to an orientation treatment and are arranged along the rubbing direction. The rubbing directions in the upper and the lower substrates are twisted with respect to each other so that they may make right angle or an angle from 200° to 290°. Thus, it can be seen that the liquid crystal molecules at the midway between the two substrates are arranged in spirals to achieve a minimum energy. In the case of an STN type device, a chiral substance is added to the liquid crystal material if necessary.

The devices described hereinbefore, however, require essentially a polarizer sheet. Furthermore, the liquid crystals must be arranged along one direction within the liquid crystal electro-optical device. Such a regular orientation of liquid crystal molecules had been achieved by rubbing an orientation film (generally an organic film) with a cotton or a velvet cloth. If not for such an orientation treatment, the liquid crystal molecules would not arrange themselves along one direction and the electro-optical effect of the liquid crystals would not be fully exhibited. Thus, a conventional device generally takes a cell-like structure comprising a pair of substrates to support the liquid crystal material therebetween, so that the liquid crystal may be injected and then imparted orientation by applying a rubbing treatment thereto to exhibit the optical effect.

In addition to the liquid crystal electro-optical devices of the type above, there is also known a dispersion-type liquid crystal capable of providing a clear and high contrast image plane, yet free of such polarizer sheets and rubbing treatment mentioned above. Referring to FIG. 2, a typical type of a prior art dispersion-type liquid crystal device is described. The two light-transmitting substrates 100 and 100' support therebetween a dispersion-type liquid crystal comprising a light-transmitting solid polymer 102 having dispersed therein granular or sponge-like liquid crystal materials 103 to give an electro-optical modulating layer. This liquid crystal device can be fabricated by dispersing encapsulated liquid crystal materials into the polymer, and then coating a film or a substrate with the resulting polymer to give a thin film. Materials such as gum arabic, poly(vinyl alcohol), and gelatin can be used for encapsulating the liquid crystal materials.

Let us consider a case in which the microcapsules are prepared by encapsulating a liquid crystal material with poly(vinyl alcohol). If the liquid crystal molecules exhibit a positive dielectric anisotropy in the polymer thin film under an electric field, the molecules are arranged in such a manner that the major axes thereof are in parallel with the electric field. Thus, if the refractive index of the liquid crystal is the same as that of the polymer, the thin film turns transparent. When the applied electric field is removed, the liquid crystal molecules take a random orientation to hinder light path, and thus the film turns opaque. Various types of information can be displayed by taking advantage of the two states, i.e., a light-transmitting and an opaque state.

Dispersion-type liquid crystals include, in addition to the encapsulated type above, those comprising liquid crystal materials being dispersed in an epoxy resin, those taking advantage of phase separation between liquid crystals and a resin by irradiating a light to a mixture of a liquid crystal and a photo-curable resin, and those comprising a three-dimensionally structured polymer having impregnated with a liquid crystal. The present invention refers to all those mentioned hereinbefore collectively as dispersion-type liquid crystals.

Because those dispersion type liquid crystal electro-optical devices can be fabricated free of polarizer sheets, an extremely high light transmittance can be achieved with the devices of this type, if compared with the conventional ones operating in a TN or an STN mode and the like. More specifically, the transmittance per polarizer sheet is about 50%, and in an device driven by an active matrix using a plurality of sheets in combination, the transmittance falls to a mere 1%. The transmittance of an STN mode device also falls to about 20%, and hence efforts are made to obtain a brighter image plane by increasing luminance of the backlighting. In contrast to these devices, a dispersion-type liquid crystal electro-optical device transmits 50% or more of the light. This owes to the fact that the device can be made completely free of polarizers.

As described in the foregoing, a dispersion-type liquid crystal functions by changing its state, i.e., a transparent state and an opaque state, and is advantageous in that it allows transmission of light at a larger amount. Thus, R & D efforts are paid mainly in realizing a transmitting-type liquid crystal electro-optical device; more particularly, in the realization of a projection type liquid crystal electro-optical device. In a projection type liquid crystal electro-optical device, the light is passed through a liquid crystal electro-optical device panel established midway in the light path of an incident light from the light source, and the light having passed through this panel is projected onto a wall via a slit having a predetermined angle. The liquid crystal molecules in the panel are in a random arrangement to give an opaque state when a low electric field below a certain threshold value is applied, i.e., when a low voltage to which the liquid crystal molecules do not respond is applied. The light is scattered upon incidence to the panel at this state, thus enlarging the light path. Then, the slit provided next to the panel cuts off most of the scattered light to give a black state to the wall. On the other hand, a light incident to liquid crystal molecules having arranged in parallel in correspondence to the applied electric field passes straight through the molecules without being scattered to yield a light state on the wall at a high brightness.

It can be seen from the foregoing description that a dispersion-type liquid crystal switches its state in accordance with the light incident to the light-control layer (electro-optical modulating layer) through a light-transmitting substrate. The light inside the light-control layer (electro-optical modulating layer) changes its light path for a plurality of times each time it comes to a boundary between the resin and the liquid crystal droplets having dispersed therein, and reaches the substrate on the other side in a greatly scattered state. Thus, to obtain a high scattering efficiency, the resin and the liquid crystal droplets are preferably arranged as such that they contact with each other as many times as possible along the thickness direction of the light control layer (electro-optical modulating layer), because the light is scattered each time it comes to the boundary between the droplet and the resin. Of course, the scattering efficiency also increases with increasing thickness of the light-control layer (electro-optical modulating layer). However, a thicker control layer (electro-optical modulating layer) also increases the distance between the substrates, i.e., the distance between the electrodes. As a result of this extended distance between the electrodes, a larger driving voltage for switching the light control layer (electro-optical modulating layer) becomes necessary. Thus, despite an improvement in scattering efficiency is achieved, the control layer (electro-optical modulating layer) then cannot be driven with an integrated circuit (IC), i.e., a thin film transistor (TFT).

SUMMARY OF THE INVENTION

Accordingly, the present invention provides a dispersion-type liquid crystal electro-optical device improved in scattering efficiency, which has also excellent light-transmitting characteristics upon application of an electric field. More specifically, the present invention relates to a liquid crystal electro-optical device comprising an electro-optical modulating layer having incorporated between a pair of substrates having established thereon an electrode, said electro-optical modulating layer containing a resin support having dispersed therein liquid crystal droplets in such a manner that the cross section of the liquid crystal droplets yield a flattened shape along the direction parallel to the substrates. At least one of the pair of substrates in transparent.

DETAILED DESCRIPTION OF THE INVENTION

The present invention relates to a technology for increasing the efficiency of light scattering in a dispersion-type liquid crystal. When a light enters into an electro-optical modulating layer comprising a resin having dispersed therein a plurality of liquid crystal droplets differing from the resin in refractive index, the light passes the electro-optical modulating layer causing refraction each time it comes to the boundary between the droplet and the resin. Thus, the scattering efficiency in an electro-optical modulating layer can be improved in two ways; one is to increase the difference in refractive index between the resin and the liquid crystal, and the other is to increase the frequency of contact between the two.

In view of the fact that there is a limit in the refractive index of a liquid crystal at around 0.2 to 0.3, the measure to take is to control the liquid crystal droplets. In general, the liquid crystal droplets to be dispersed in an electro-optical modulating layer are typically fabricated by any of the three processes below.

A first process comprises injecting a mixture of a liquid crystal material and a ultraviolet (UV)-curable resin having mixed at a ratio of the former to the latter in the range of from 4/6 to 8/2 between a pair of substrates, and then irradiating an ultraviolet light from the substrate side to cure the UV-curable resin. In this process, the sample is preferably temperature-controlled within the range of from 5° to 40° C. higher than the temperature at which the liquid crystal-resin mixture undergoes phase transition from an isotropic phase to a liquid crystal phase.

A second process comprises preparing first a solution by dissolving the liquid crystal and the resin in a solvent, coating a substrate with the resulting solution by either a spinner method or a casting method, and then gradually removing the solvent by volatilization to form an electro-optical modulating layer. The resin to be used in this process include polyethylene terephthalate, polyfumaric ester, polycarbazole, and poly(methyl methacrylate) (PMMA). Another substrate may be provided on the resin and the liquid crystal of the electro-optical modulating layer.

A third process comprises encapsulating the liquid crystal by poly(vinyl alcohol).

Figure 1:
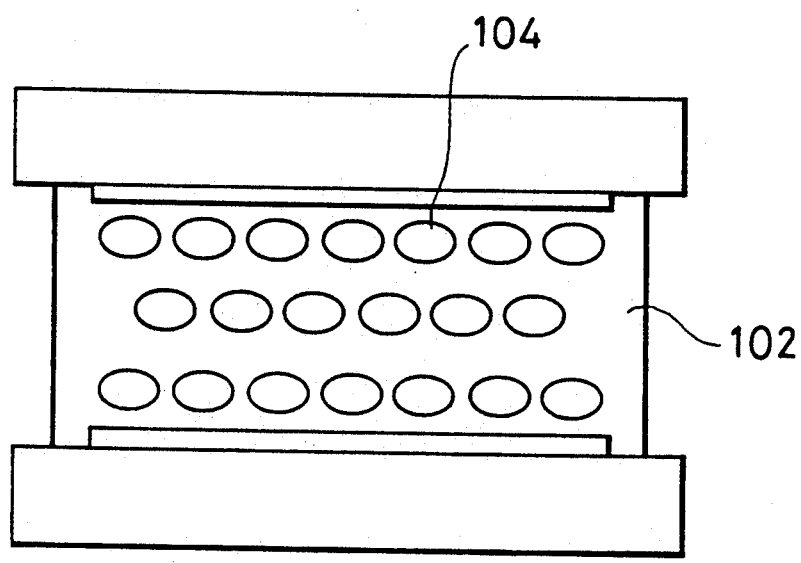
FIG. 1 shows a schematically drawn cross section of the liquid crystal electro-optical device according to the present invention.
Figure 2:
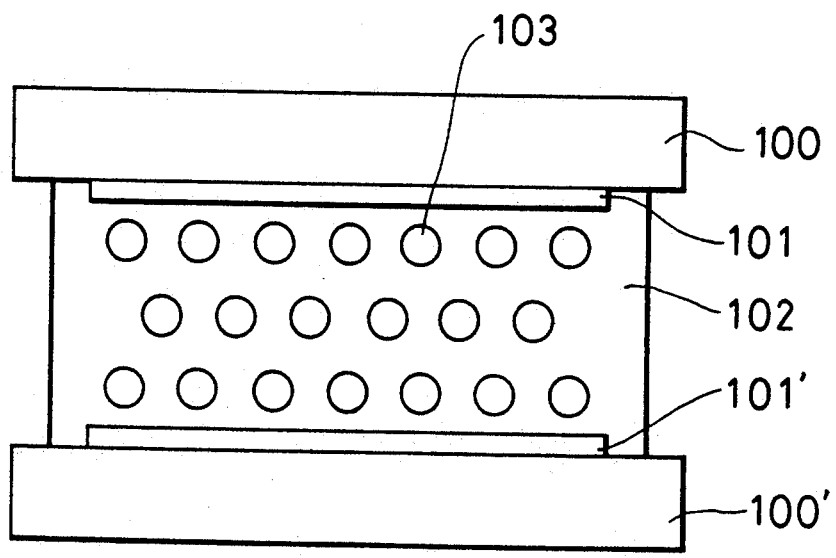
FIG. 2 shows a schematically drawn cross section of a prior art liquid crystal electro-optical device.

Any of the aforementioned three processes provides spherical liquid crystal droplets, as shown schematically in FIG. 2. Those spherical droplets are obtained without applying any external fields, but they are stable as they are, in an isotropic state. If we consider only the increase in scattering efficiency, the resin and the liquid crystal are preferably brought into contact with each other as frequently as possible. Thus, as shown in FIG. 1, light scattering can be more efficiently achieved by providing flattened droplets 104 as shown in FIG. 1, i.e., by using flat (oblate) droplets having elongated along the direction parallel to the substrate planes of the electro-optical modulating layer. Those flat (oblate)

droplets can be realized by applying pressure between the two substrates, i.e., to the spherical droplets having prepared in an ordinary manner. In other words, the spacing between the substrates is reduced to obtain flat (oblate) droplets. In practice, flat (oblate) droplets can be readily obtained by heating the whole structure to a temperature in the range of from 50° to 150° C., and applying a pressure of from 1 to 5 kg/cm² to the substrates. Then, the liquid crystal droplets can retain their flat (oblate) shape by releasing the pressure after lowering the temperature of 40° C. or lower. A length of the flat (oblate) liquid crystal in a direction parallel to the substrates is larger than that in a direction perpendicular to the substrates. The flat (oblate) droplets preferably have a major to the minor axis ratio, i.e., the ratio of the length of the axis vertical to the normal of the substrate to that of the axis parallel to the same, of from 1.2 to 5.0 to obtain favorable scattering efficiency.

The droplets thus transformed yield larger surface area as compared to spherical droplets. When the droplets reduce their diameter in a dispersion-type liquid crystal, there sometimes occur that the liquid crystal droplets maintain a scattered state instead of taking a light-transmitting state even under application of an electric field. That is, the decrease in the diameter of the droplets increases the number of phase boundaries to increase the scattering efficiency. However, on the other hand, the increased resin boundaries regulate the movement of the liquid crystal molecules. Such a phenomenon was not distinctly observed experimentally when the droplets fell in the diameter range of from 0.5 to 3 $\mu$m. The same phenomena were observed on flat (oblate) droplets. Accordingly, a high scattering efficiency can be obtained most effectively by preparing first droplets at a relatively large diameter, and then transforming the droplets into those having a minor axis of from 1 to 4 $\mu$m. The liquid crystal thus prepared provides, furthermore, a high light-transmittance upon applying an electric field.

The present invention is described in further detail referring to some examples below. However, it should be understood that the present invention is not to be construed as being limited to those examples.

EXAMPLE 1

Figure 3:
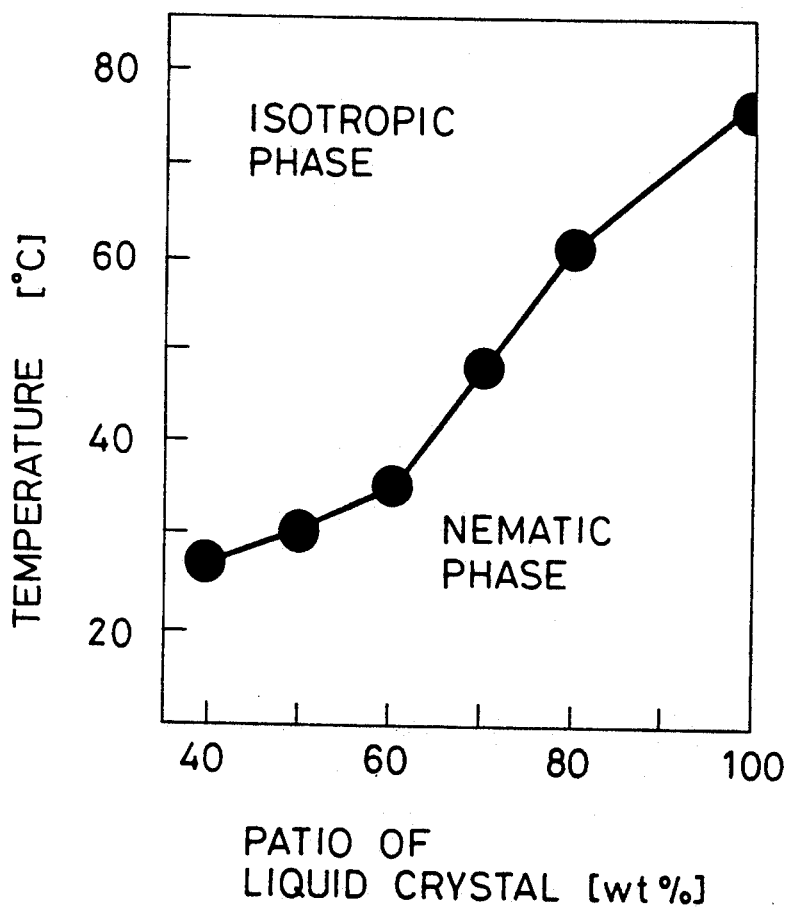
FIG. 3 is a phase diagram of a mixed system of a liquid crystal and a resin.

The present example provides a dispersion-type liquid crystal using a UV-curable resin. A dispersion-type liquid crystal as shown in FIG. 2 was first fabricated by a conventional process. Accordingly, light-transmitting electrically conductive indium-tin-oxide (ITO) films as the clear electrodes were deposited to a thickness of from 500 to 2,000 Å on light-transmitting substrates 100 and 100' by a known process such as vapor deposition and sputtering. The sheet resistance of the thus obtained films was in the range of from 20 to 200 $\Omega$/cm². The resulting film was then patterned by a conventional photolithographic process. The first and the second substrates thus obtained were laminated together under pressure incorporating therebetween an inorganic spacer having a diameter of from 5 to 100 $\mu$m, preferably, from 7 to 30 $\mu$m, to thereby obtain a cell having established with a constant spacing corresponding to the diameter of the spacer. Then, a mixed system prepared by mixing a cyanobiphenyl nematic liquid crystal having a refractive index of 1.582 and a $\Delta$n of 0.240 with a photocurable resin (ultraviolet ray hardening resin) having a refractive index of 1.573 (a mixture obtained from a urethane-based oligomer and an acrylic monomer) was used as the liquid crystal material. The phase diagram for this mixed system is given in FIG. 3. It can be seen from this figure that the temperature of phase transition from an isotropic phase to a nematic phase (N-I phase transition point) decreases with increasing the ratio (fraction) of the liquid crystal.

The liquid crystal mixed system thus prepared was injected between the first and the second substrates of the liquid crystal cell having fabricated above, at a temperature higher than the N-I phase transition point of the mixed system. Then, to the liquid crystal mixed system inside the liquid crystal cell was irradiated a UV light at an irradiation intensity of from about 10 to about 100 mW/cm² for a duration of from about 30 to about 300 seconds, to thereby cure the resin while allowing the system undergo phase separation. As a result, liquid crystal droplets 103 were formed inside the resin 102 and an electro-optical modulating layer comprising a resin and a liquid crystal dispersed in the resin is formed between the first and the second substrates.

Figure 4:
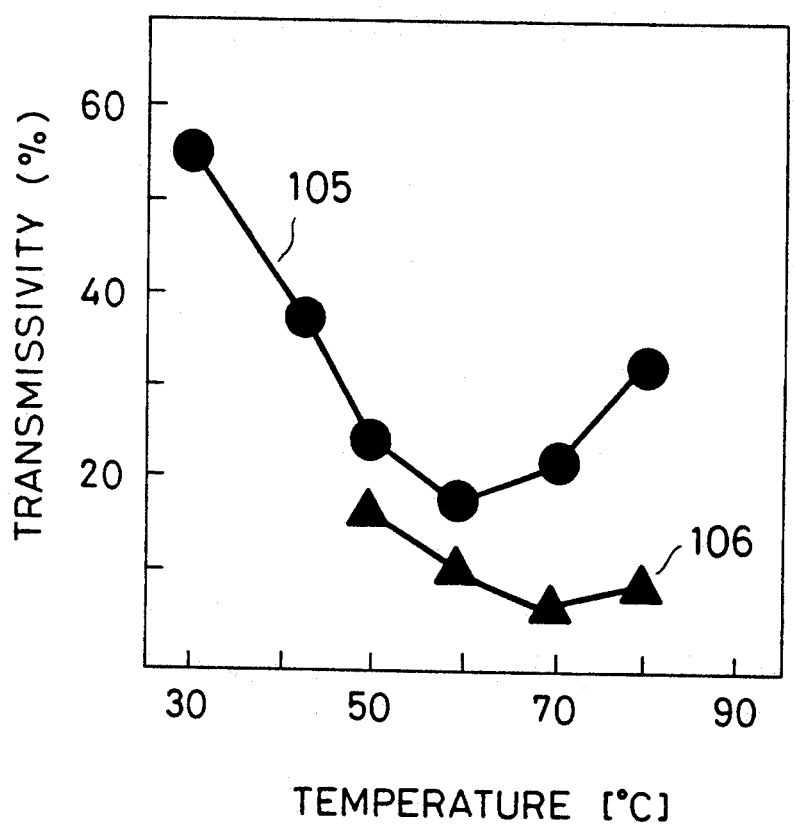
FIG. 4 is a graph which shows the change in light transmissivity of specimens having prepared at various temperatures, illustrating an effect obtained as a consequence of the present invention.

In FIG. 4 is given the scattering transmissivity (marked with 105 in the figure) of the cells having fabricated by curing a 6:4 mixture of a liquid crystal material and a resin at various temperatures. The scattering transmissivity was measured at zero applied electric field. It can be seen therefrom that a lowest scattering transmissivity is obtained on a cell having cured at 60° C. The liquid crystal cells thus obtained were then pressed by pressing the first and the second substrates at a pressure of 2 kg/cm² to transform the liquid crystal into an oblate shape, and the scattering transmissivity thereof were measured again. The results are plotted in FIG. 4, marked with 106. The scattering transmissivity is lowered in whole. The scattering transmissivity of the resulting cells measured under an applied electric field was maximum for a cell having fabricated at a curing temperature of 60° C. The cross section view of this cell shows that the dispersed liquid crystal droplets have in average, a minor axis of 2.3 $\mu$m and a major axis of 3.5 $\mu$m.

EXAMPLE 2

A first substrate was fabricated by depositing a clear electrode film on a light-transmitting substrate by sputtering, and then patterning the resulting film. The substrate thus obtained was coated with a liquid crystal dispersion layer by a casting process which comprises applying a mixed system containing a cyanobiphenyl nematic liquid crystal having a refractive index of 1.582 and a $\Delta$n of 0.240 having encapsulated with poly(vinyl alcohol), and then drying out the solvent. Thus was obtained a liquid crystal layer at a thickness of 20 $\mu$m. A second substrate was thereafter fabricated in a similar manner as in the fabrication of the first substrate, and further a TFT was provided thereon. The second substrate thus obtained was tightly adhered and fixed to the first substrate by a lamination process comprising vacuum evacuation. The use of a laminator was highly effective in producing flat (oblate) liquid crystal droplets according to the present invention, because the flattening of the dispersed liquid crystal droplets can be carried out simultaneously with the adhesion of the substrates.

Thus a liquid crystal cell was fabricated using this apparatus while maintaining the temperature constant at 70° C. and varying the applied pressure. Lowest scattering transmissivities were obtained under an applied pressure in the range of from 2 to 4 kg/cm². With a pressure higher than this range, the droplets yield too a little minor axis 1 μm or less and hence become unfavorable to give a high scattering transmissivity.

The liquid crystal material for use in the present invention can be properly selected from among nematic, cholesteric, and smectic liquid crystal materials. If necessary, a mixture thereof can also be used. If a smectic liquid crystal were to be used, a liquid crystal electro-optical device having an even higher scattering efficiency can be obtained because the molecular arrangement of the liquid crystal can be furthermore disturbed by the pressing according to the present invention. This signifies that a liquid crystal electro-optical device having a high display contrast is realized. If desired, a bi-chromatic dye and the like may be added to the liquid crystal material (the electro-optical modulating layer) to realize a guest-host type liquid crystal electro-optical device.

In the description above, the dispersed liquid crystal material is referred to as droplet and drawn in the form of circle or flat (oblate) circle in the figures. The present invention is not limited to such shapes. Other shapes or a liquid crystal impregnated in a cave of a three-dimensionally extending resin net provides a similar effect.

As described in detail in the foregoing, the dispersion-type liquid crystal electro-optical device according to the present invention has a high scattering efficiency and provides an excellent light-transmittance upon application of an electric field.

The liquid crystal according to the present invention is also advantageous in that it provides a clear liquid crystal display; it has a milky white background as if the image were such provided as a printing on a sheet of paper.

While the invention has been described in detail and with reference to specific embodiments thereof, it will be apparent to one skilled in the art that various changes and modifications can be made therein without departing from the spirit and scope thereof.

What is claimed is:

1. An electro-optical device comprising:
   a pair of substrates at least one of which is transparent, said substrates having at least patterned electrodes formed thereon; and
   an electro-optical modulating layer provided between said substrates and comprising a resin and an oblate liquid crystal dispersed in said resin,
   wherein said oblate liquid crystal is shaped by pressing said pair of substrates towards one another with said resin having said liquid crystal therein so that a length of said oblate liquid crystal in a direction parallel to said substrates is larger than that in a direction perpendicular to said substrates.

2. The device of claim 1 wherein a ratio of a length of said oblate liquid crystal in the direction parallel to said substrates to a length of said oblate liquid crystal in the direction perpendicular to said substrates is 1.2 to 5.0.

3. The device of claim 1 wherein said oblate liquid crystal comprises a liquid crystal selected from the group consisting of nematic liquid crystal, cholesteric liquid crystal and smectic liquid crystal.

4. The device of claim 3 wherein said electro-optical modulating layer comprises a dye.

5. The device of claim 1 wherein a refractive index of said oblate liquid crystal is different from that of said resin.

6. The device of claim 1 wherein said oblate liquid crystal has a minor axis of 1 to 4 μm.

7. A method for forming an electro-optical device comprising the steps of:
   forming between a pair of substrates an electro-optical modulating layer comprising a resin and a liquid crystal dispersed in said resin; and
   transforming said liquid crystal into an oblate shape by pressing said substrates toward one another.

8. The method of claim 7 wherein said liquid crystal comprises a liquid crystal selected from the group consisting of nematic liquid crystal, cholesteric liquid crystal and smectic liquid crystal.

9. The method of claim 8 wherein said electro-optical modulating layer comprises a dye.

10. The method of claim 7 wherein said substrates are pressed at a pressure of 1 to 5 kg/cm$^2$ during said transforming step.

11. The method of claim 7 wherein said liquid crystal is encapsulated.

12. The method of claim 11 wherein said resin comprises a polyvinyl alcohol encapsulating said liquid crystal.

13. The method of claim 7 wherein said electro-optical modulating layer forming step is carried out by applying a solution comprising said resin, said liquid crystal and a solvent to one of said substrates, subsequently volatilizing said solvent, and providing the other one of said substrates on said resin and said liquid crystal.

14. The method of claim 7 wherein said substrates are pressed at a temperature of 50° to 150° C. during said transforming step.

15. The method of claim 13 wherein the application of said solution is carried out by spinner method or cast method.

16. A method for forming an electro-optical device comprising the steps of:
   forming between a pair of substrates an electro-optical modulating layer comprising an ultraviolet ray hardening resin and a liquid crystal;
   irradiating said electro-optical modulating layer with an ultraviolet ray; and
   transforming said liquid crystal into an oblate shape by pressing said substrates toward one another.

17. The method of claim 16 wherein said liquid crystal comprises a liquid crystal selected from the group consisting of nematic liquid crystal, cholesteric liquid crystal and smectic liquid crystal.

18. The method of claim 17 wherein said electro-optical modulating layer comprises a dye.

19. The method of claim 16 wherein said substrates are pressed at a pressure of 1 to 5 kg/cm$^2$ during said transforming step.

20. The method of claim 16 wherein said substrates are pressed at a temperature of 50° to 150° C. during said transforming step.

21. A method for forming an electro-optical device comprising the steps of:
   forming an electro-optical modulating layer between a pair of substrates having at least patterned electrodes formed thereon, said electro-optical modulating layer comprising a resin and droplets of a liquid crystal dispersed in said resin; and
   pressing said pair of substrates towards one another in order that the cross section of said droplets in a direction parallel to said substrates is increased.

22. The method of claim 21 wherein said substrates have TFTs for switching said electro-optical modulating layer.

23. A method for forming an electro-optical device comprising the steps of:
   forming between a pair of substrates an electro-optical modulating layer comprising a resin and a liquid crystal dispersed in said resin; and
   reducing the space between said pair of substrates.

24. The method of claim 23 wherein said reducing step is performed by pressing said pair of substrates toward one another after curing said resin.

* * * * *